US006994012B2

(12) United States Patent
Foster

(10) Patent No.: US 6,994,012 B2
(45) Date of Patent: Feb. 7, 2006

(54) DRIVE UNITS AND DRIVE ASSEMBLIES

(75) Inventor: Raymond Keith Foster, Madras, OR (US)

(73) Assignee: Keith Investments, LLC, Madras, OR (US)

( * ) Notice: Subject to any disclaimer, the term of this patent is extended or adjusted under 35 U.S.C. 154(b) by 134 days.

(21) Appl. No.: 10/375,225

(22) Filed: Feb. 26, 2003

(65) Prior Publication Data

US 2004/0163530 A1 Aug. 26, 2004

(51) Int. Cl.
*F15B 15/20* (2006.01)

(52) U.S. Cl. ...................................... 91/392; 198/750.2

(58) Field of Classification Search .................. 91/392, 91/508; 198/750.1, 750.2; 414/525.1
See application file for complete search history.

(56) References Cited

U.S. PATENT DOCUMENTS

| | | | | | |
|---|---|---|---|---|---|
| 5,263,573 | A | * | 11/1993 | Hallstrom, Jr. | 198/750.6 |
| 5,353,918 | A | * | 10/1994 | Foster | 198/750.5 |
| RE35,022 | E | * | 8/1995 | Foster | 198/750.5 |
| 5,605,221 | A | * | 2/1997 | Foster | 198/750.5 |
| 5,638,943 | A | * | 6/1997 | Foster | 198/750.5 |

FOREIGN PATENT DOCUMENTS

| | | | |
|---|---|---|---|
| EP | 0721901 | * | 7/1996 |

* cited by examiner

*Primary Examiner*—Hoang Nguyen
(74) *Attorney, Agent, or Firm*—Delbert J. Barnard

(57) ABSTRACT

A threaded nipple (26) at the closed end of a linear hydraulic motor (12) is received within a recess (82) in a frame member (78). Single clamp members, or individual clamp members (88), have recesses (92) that receive lower portions of the nipples (26). Bolts (94) extend through the clamp members (88) and screw into threaded openings in the frame member (78). This clamps the nipples (26) between the frame member (78) and the removable clamp members (88). End members (22) at the rod ends of the cylinders (12) include keys (66) that are received within recesses (80) formed in another frame member (76). Bolts (76) extend through the end member (22) and screw into threaded openings (84) in the member (76). A mounting frame has transverse mounting frame members (74, 102, 74', 102') that are used for mounting the drive assembly in an installation. The mounting frame members (74', 102') may have end portions (208, 210, 212, 214, 240, 242) that serve as cells in a trailer installation. The drive units may have a continuous piston-rod (50') or short piston-rods (50, 50") that are attached to push-rods (14, 14'). The connection may allow a limited amount of pivotal movement between the push-rod (14') and the piston-rod (50").

11 Claims, 17 Drawing Sheets

DRIVE UNITS AND DRIVE ASSEMBLIES

TECHNICAL FIELD

This invention relates to linear hydraulic drive units and to drive assemblies composed of the linear hydraulic drive units, transverse drive beams and mounting frames.

BACKGROUND OF THE INVENTION

My U.S. Pat. No. Re 35,022, granted Aug. 22, 1995, and entitled Reduced Size Drive/Frame Assembly For Reciprocating Floor Conveyor discloses a drive assembly composed of a small mounting frame, three drive units and three transverse drive beams, one for each drive unit. My U.S. Pat. No. 5,638,943, granted Jun. 17, 1997 and entitled Drive Assembly For Reciprocating Slat Conveyor discloses a mounting frame that includes a downwardly extending center cavity region for receiving the linear hydraulic drive units.

My U.S. Pat. No. 5,605,221, granted Feb. 25, 1997, discloses a drive assembly (FIGS. 32–34) comprising a plurality of drive units, a transverse drive beam for each drive unit, and mounting structure for the drive units. Other prior art drive units and mounting structure are disclosed by my U.S. Pat. No. 5,353,918, granted Oct. 11, 1994, by U.S. Pat. No. 5,263,573, granted Nov. 13, 1993 to Olaf A. Hallstrom, and by European patent application EP 0 721 901 A1, filed by Cargo Handling Systems, B.V. on Jan. 15, 1996. All of these patents should be carefully considered for the purpose of putting the present invention into proper perspective relative to the prior art.

BRIEF SUMMARY OF THE INVENTION

Drive units of the present invention are basically characterized by a hydraulic cylinder connected to a transverse frame member having a downwardly directed recess. The hydraulic cylinder has a sidewall forming a piston chamber, a closed end, a rod end, a piston head within the piston chamber, and a piston rod connected to the piston head and extending axially of the hydraulic cylinder out through the rod end of the hydraulic cylinder. An end member is provided at the closed end of the hydraulic cylinder. The end member has a radial wall portion and a tubular nipple portion that extends axially outwardly from the radial wall portion. The radial wall portion includes an outer surface extending radially outwardly from the tubular nipple. A removable clamp member is connectable to the frame member. The clamp member includes a recess for receiving a portion of the tubular nipple. The tubular nipple is received in the recess in the frame member. The radial outer surface of the radial wall portion of the end member contiguous a surface of the frame member that borders the recess in the frame member. The recess in the removable clamp member receives a portion of the tubular nipple that is not within the recess in the frame member. Bolts removably connect the clamp member to the frame member, with the tubular nipple portion of the end member being received in and clamped by and between the recess in the frame member and the recess in the clamp member.

According to an aspect of the invention, the tubular nipple includes an axial center opening and a tubular fitting is received within said center opening. The tubular fitting provides a passageway for hydraulic fluid entering into and leaving from the piston chamber at the closed end of the hydraulic cylinder.

In preferred form, the tubular fitting includes a valve and a valve operator that extends axially into the piston chamber and includes an inner end portion that is adapted to be contacted by the piston head. When the piston head is retracted into the piston chamber, it contacts the inner end of the valve operator and moves the valve operator outwardly. In response to such movement, the valve operator opens the valve. The valve is normally closed when the piston head is not depressing the valve operator. In preferred form, the valve includes a valve seat and a valve plug outwardly of the valve seat that is connected to the outer end of the valve operator. The valve also includes a compression spring that operates to normally seat the valve plug against the valve seat.

In preferred form, an outer surface of the tubular nipple, the recess in the transverse frame member and the recess in the removable clamp member have complementary interlocking surfaces which function to prevent axial movement of the hydraulic cylinder relative to the transverse frame member and the removable clamp member.

According to another aspect of the invention, the hydraulic cylinder includes a rod-end member having a base, a radial end wall extending upwardly from a portion of said base, and a key extending above another portion of said base and axially from the radial end wall. The rod-end member also includes a piston rod opening extending through the key and through a portion of the base. The rod-end member further includes a nook above the base and the key. The nook is bounded on one side by the radial end wall. The base includes a pair of shoulders, one on each side of the key. A pair of bolt-receiving openings extends through the base and the shoulders. A transverse frame member at the rod end of the hydraulic cylinder includes a key-receiving recess adapted to snugly receive the key. This frame member includes a side surface that is contiguous the radial end wall of the rod-end member when the key is in the key recess. The frame member includes a pair of shoulders, one on each side of the key recess. The frame member shoulders confront the shoulders on the rod-end member when the key is in the key recess and the side surface is contiguous the radial end wall. The frame member shoulders have bolt-receiving openings therein that are alignable with the bolt-receiving openings in the rod-end member when the key is within the key recess and the side surface of the frame member is contiguous the radial end wall of the rod-end member. Bolts extend through the bolt-receiving openings in the rod-end member and the bolt-receiving openings in said frame-member shoulders. The bolts connect the rod-end member of the hydraulic cylinder to the transverse frame member.

Another aspect of the invention is to provide the piston rod with a second end portion outside of the cylinder body that is connected to a push rod. The piston rod has a convex, substantially spherical end shape. The push rod includes a bell-shaped end member having a concave inner end surface substantially conforming to the convex end shape of the piston rod. It also has a convex outer end surface of substantially spherical curvature. A coupler is connected to the piston rod axially inwardly of the convex end of the piston rod. The coupler includes an annular wall portion surrounding the outer end of the piston rod. The annular wall portion has a concave inner surface that substantially conforms to the convex outer surface of the bell-shaped end member on the push-rod. The convex and concave surfaces on said bell-shaped end member and said concave surface on said coupler and said convex end shape on said piston-rod together form a ball joint within the coupler by which the piston-rod is pivotally connected to the push-rod.

In preferred form, at least an end portion of the push rod is tubular and is internally threaded. An end member on the push rod member has complementary external threads that connect to the internal threads in the push-rod. The coupler that is attached to the piston-rod is axially split into two halves. Bolts extend between the two halves and secure them together. The piston-rod and the two halves of the coupler include interlocking portions where the two halves of the coupler contact the piston-rod. The interlocking portions prevent axial movement of the coupler halves relatively along the piston-rod. The invention also provides an unique mounting frame having channel shaped end portions.

Other objects, advantages and features of the invention will become apparent from the description of the best mode set forth below, from the drawings, from the claims and from the principles that are embodies in the specific structures that are illustrated and described.

BRIEF DESCRIPTION OF THE SEVERAL VIEWS OF THE DRAWING

Like reference numerals are used to designate like parts throughout the several views of the drawing, and.

DETAILED DESCRIPTION OF THE INVENTION

Figure 8:
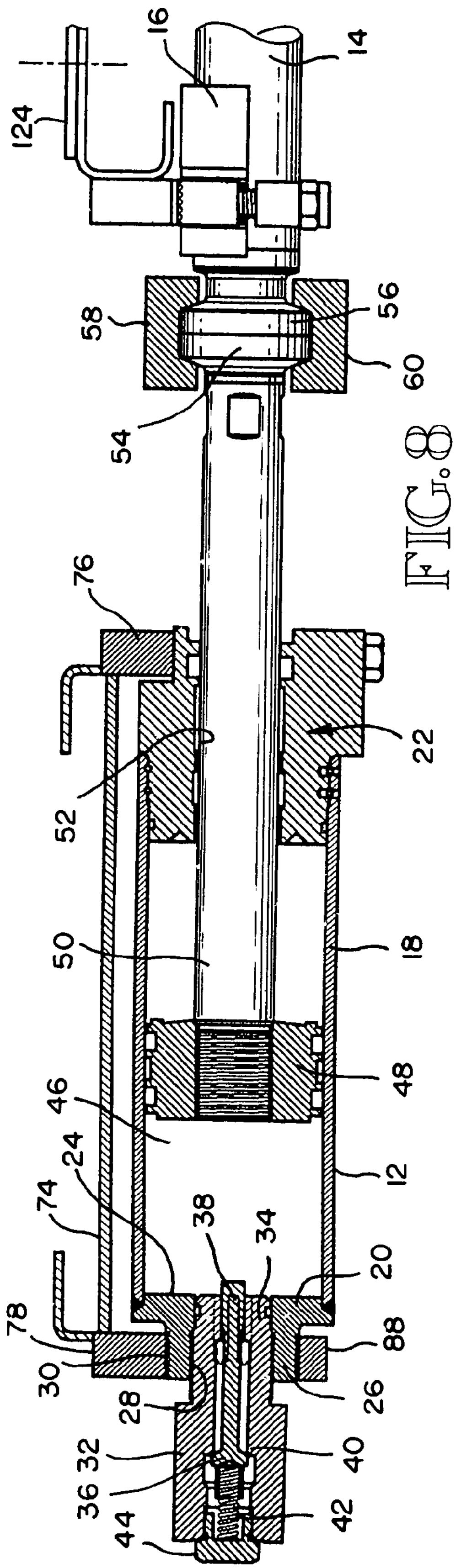
FIG. 8 is an enlarged scale view of the left end portion of FIG. 7.
Figure 9:
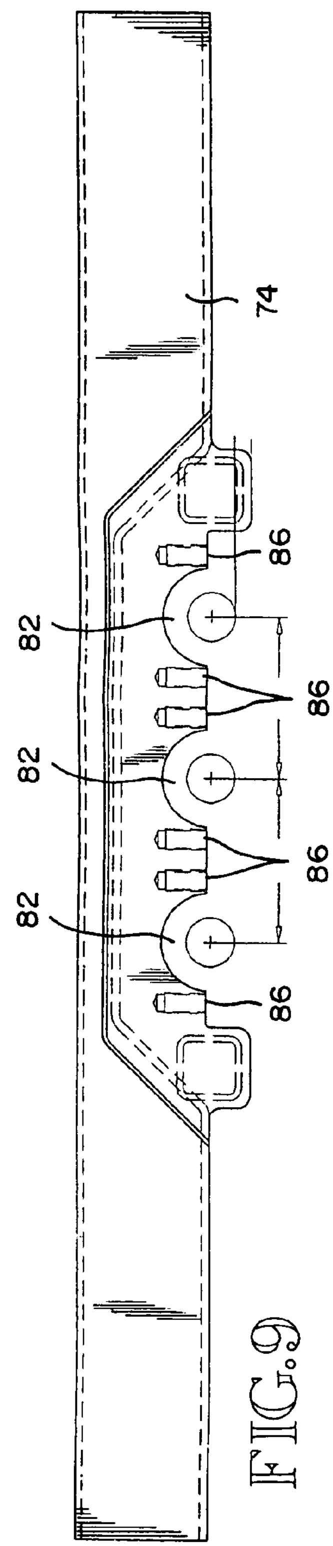
FIG. 9 is an end view of the mounting frame at the end where the hydraulic cylinders are connected to the mounting frame.
Figure 10:
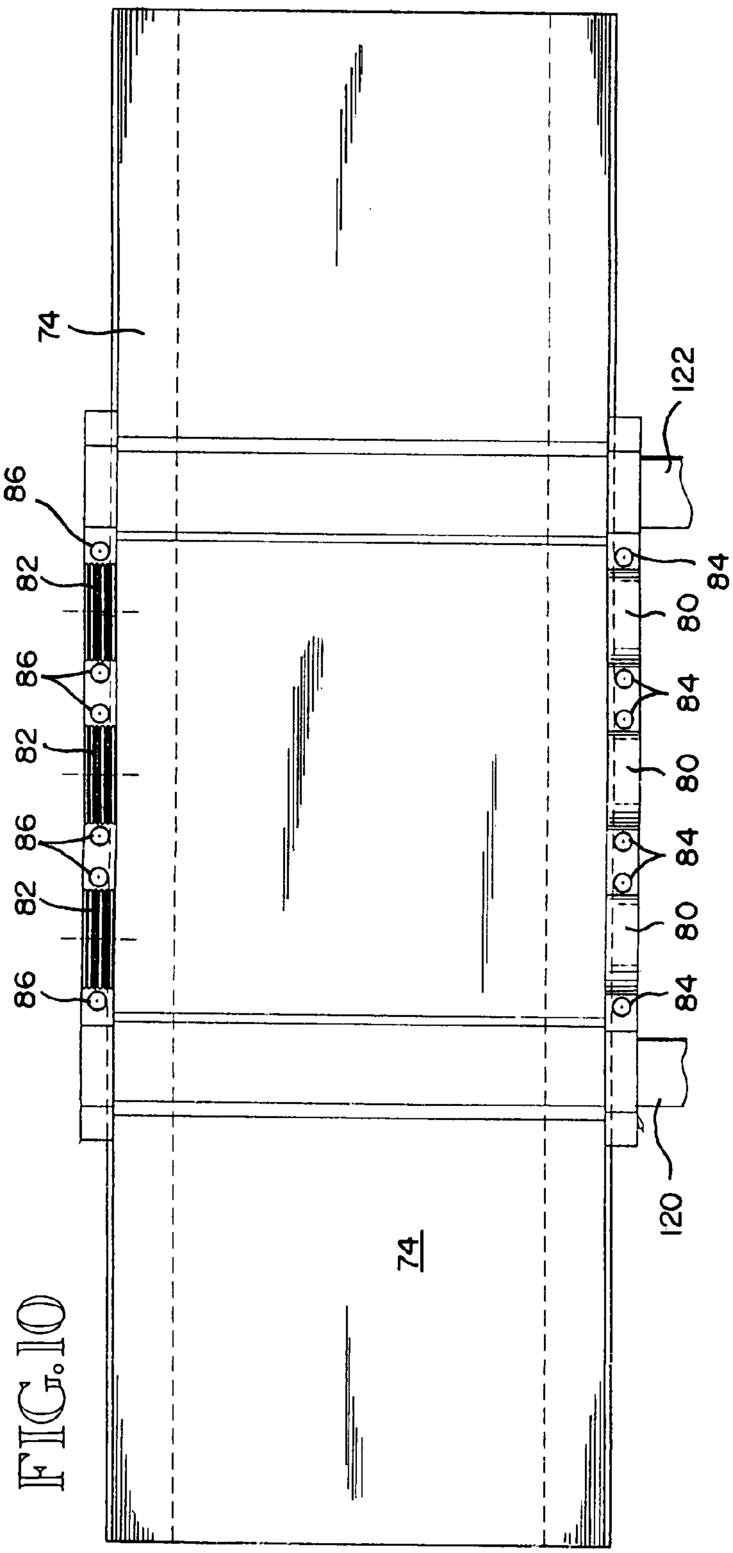
FIG. 10 is a bottom plan view of FIG. 9.
Figure 12:
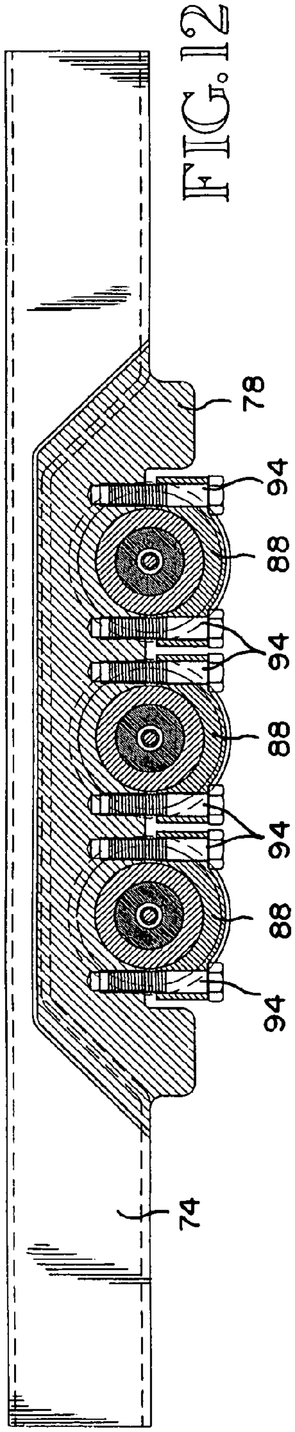
FIG. 12 is a transverse sectional view taken substantially long line 12—12 of FIG. 8.
Figure 13:
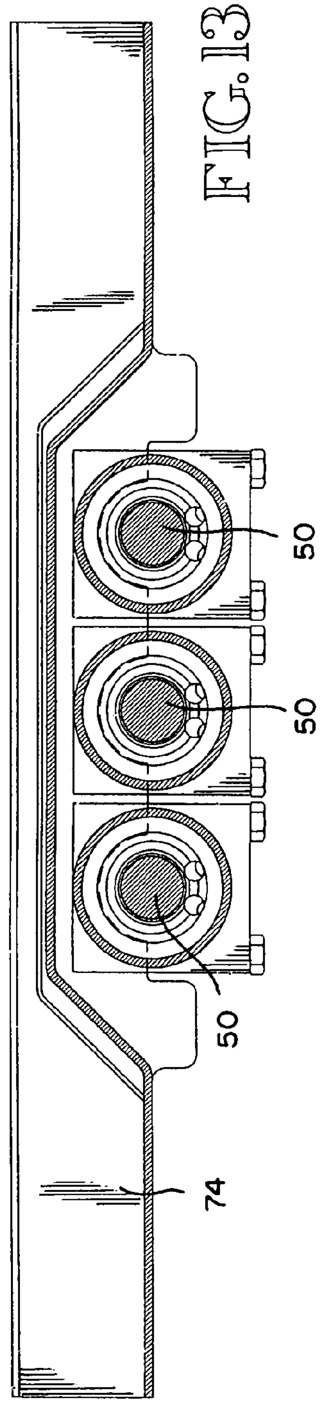
FIG. 13 is a transverse sectional view taken substantially along line 13—13 of FIG. 8.
Figure 14:
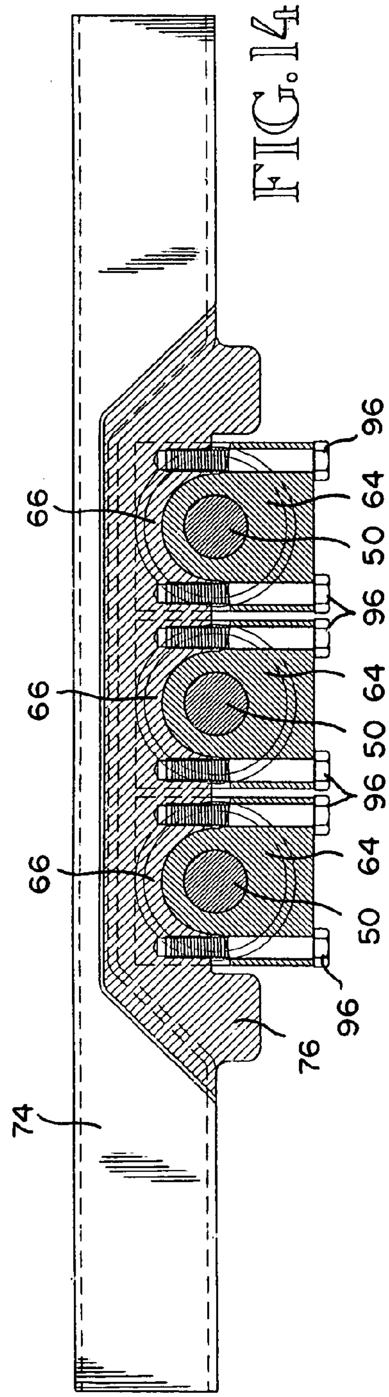
FIG. 14 is a transverse sectional view taken substantially along line 14—14 of FIG. 8.

FIGS. 1–14 show a first embodiment of a drive assembly 10 that is constructed in accordance with the present invention. It comprises three drive units, each comprising a linear hydraulic cylinder 12 and a push-rod 14. Each push-rod 14 includes a semi-cylindrical fitting 18 that is welded to the push-rod 14. Referring to FIG. 8, each linear hydraulic cylinder 12 includes a tubular sidewall 18, a closed end fitting 20 and a rod-end fitting 22. Closed end fitting 20 and closed radial end wall 24 and a tubular nipple 26 connect to the end wall 24 and project axially outwardly from it. Each nipple 26 includes an axial center opening 28. Opening 28 is internally threaded. The outer periphery 40 is externally threaded. An end fitting 32 has an externally threaded inner end portion 34 that threads into the center opening 28. Fitting 32 has a center opening that receives a valve plug 36 that includes a valve operator 38. The valve plug 36 is biased towards a valve seat 40 by a spring 42. Spring 42 is positioned between the valve plug 36 and an end cap 44. End cap 44 includes an externally threaded inner end portion that threads into an internally threaded center opening in the fitting 32. The fitting 32 provides a center passageway through which hydraulic fluid flows into and out from the working chamber 46.

A piston head 48 is located inside of the tubular sidewall 18. A piston-rod 50 has an inner end that is connected to the piston-head 48. Piston-rod 50 extends from the piston-head 48 through the center opening 52 in the rod-end member 22. Outside of the piston chamber, the piston-rod 50 extends to an enlarged end member 54. In this embodiment, another end member 56 is connected to the adjacent end of the push-rod 14. A two-part clamp 58, 60 serves to connect the two members 54, 56 together. The clamp parts 58, 60 are secured together by a plurality of bolts 62, as shown by FIGS. 4 and 5.

Figure 3:
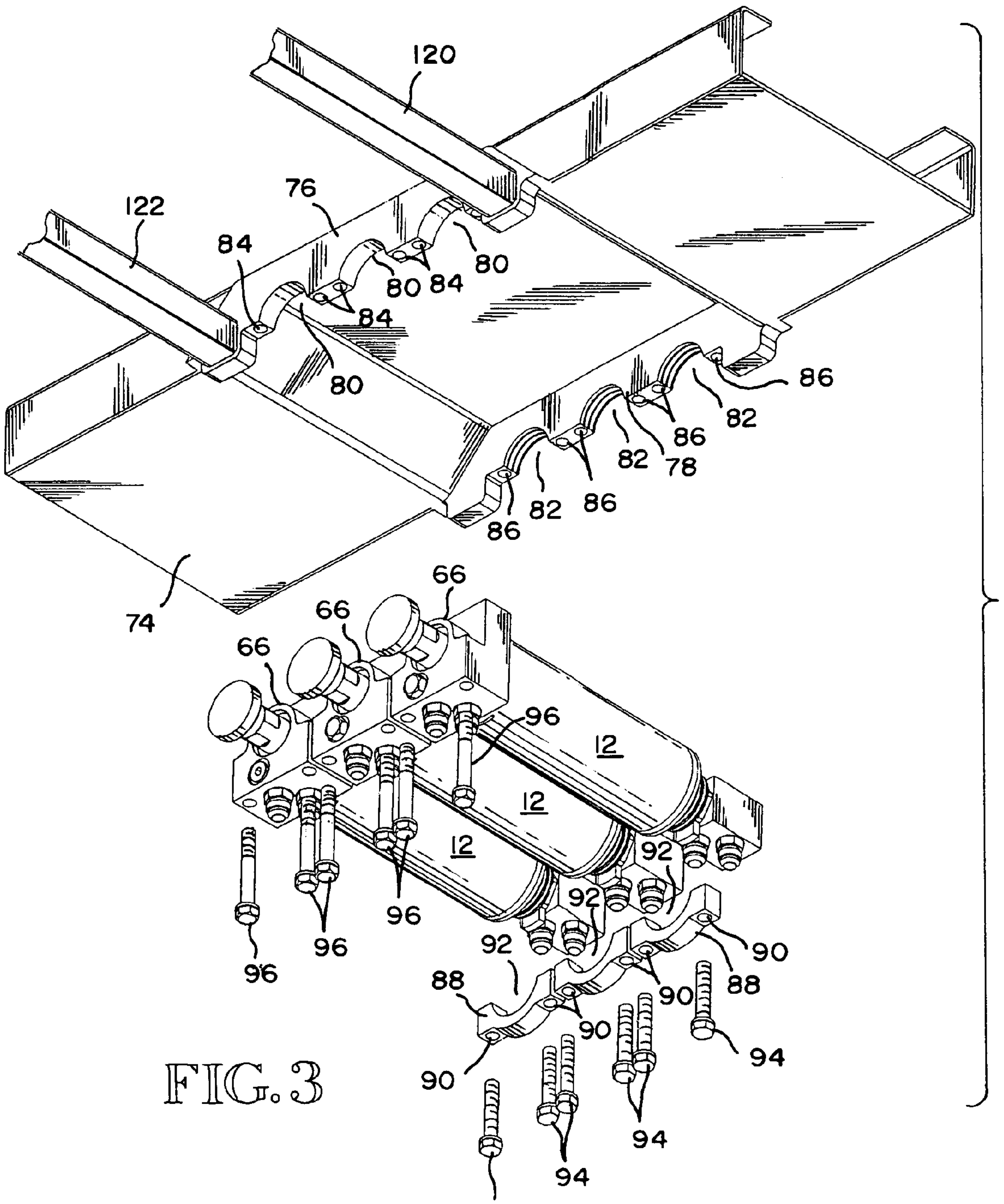
FIG. 3 is a pictorial view of the right end portion of FIG. 2, showing the hydraulic cylinders spaced below the mounting frame and the mounting bolts spaced from the ends of the cylinders.
Figures 4, 5:
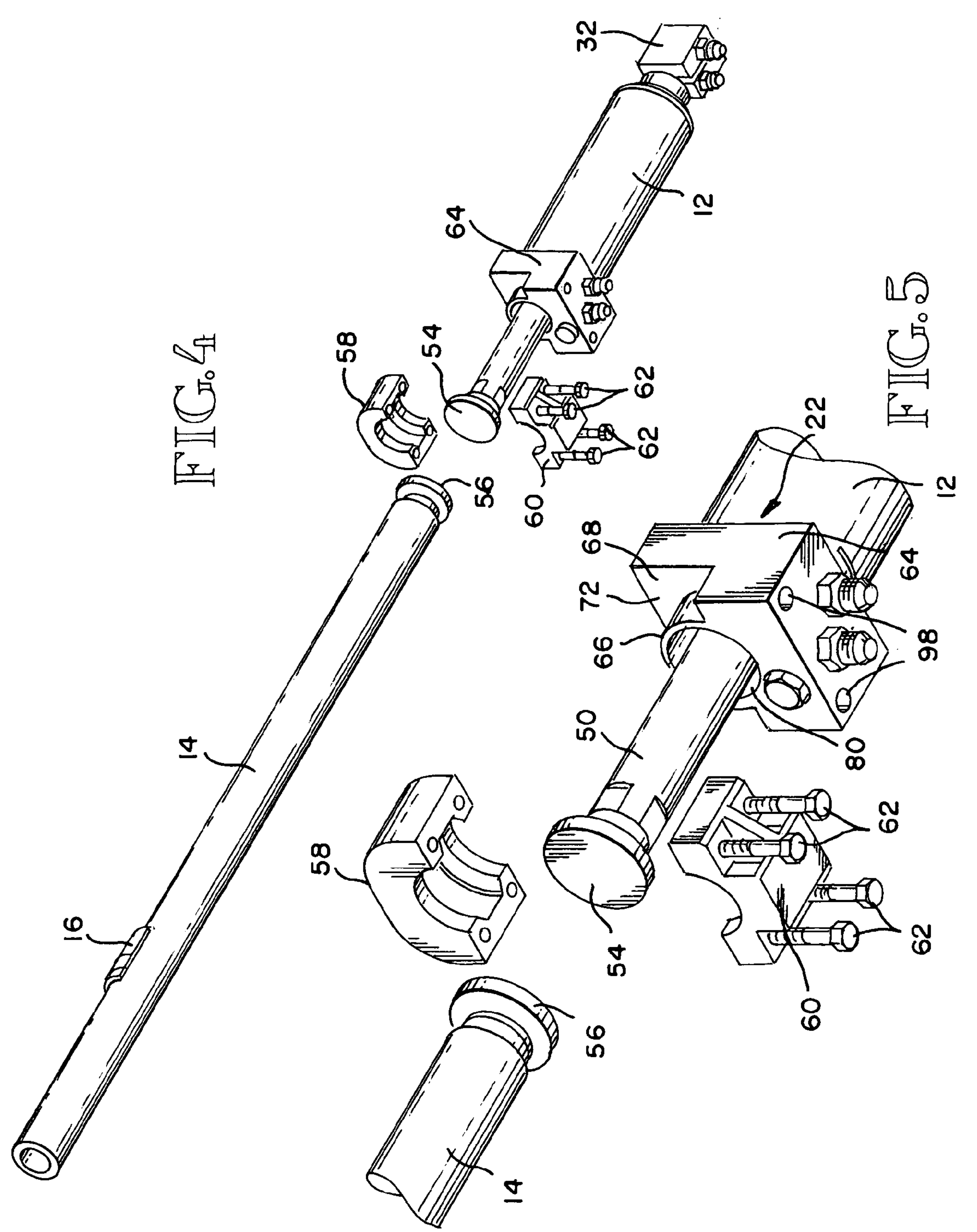
FIG. 4 is a pictorial view of one of the drive units, taken from below the drive unit and showing the drive rod detached from the piston rod of the cylinder.
FIG. 5 is an enlarged scale fragmentary view of the region of the coupler that connects the drive rod to the piston rod.

Referring to FIG. 5, the rod end of member 22, comprises a base 64, a radial wall 6 and a semi-cylindrical key 66. The piston-rod 50 extends through an opening 80 that extends through the key 66 and a portion of the base 64. A nook 72 is formed above the base 64 and the key 66 and adjacent the wall 68. Referring to FIG. 3, the linear hydraulic motors or cylinders 12 are connected to a transverse mounting frame 74. Frame 74 includes a rod-end frame member 76 and a closed end frame member 78. Each of these frame members 76, 78 includes a plurality of downwardly opening recesses 80, 82, one for each linear hydraulic motor 12. The recesses 80 are sized and shaped to receive the keys 66. When the keys 66 are within the recesses 80, the walls 68 are contiguous the inner surface of the frame member 76. This is shown by FIG. 8, for example.

The upper halves of the nipples 26 are received within the recesses 82. Frame member 76 includes bolt-receiving openings 84. Frame member 78 includes bolt-receiving openings 86. Clamp members 88 are provided for the closed ends of the cylinders 12. Each clamp member 88 includes a pair of bolt-receiving openings 90. When the upper portions of the nipples 32 are within the recesses 82, the recesses 92 in the clamps 90 are fittable over the lower portions of the nipples 26. Then the bolts 94 are inserted through first the openings 90 and then into the openings 86. The openings 86 are internally threaded. When the bolts 94 are tightened, they thread into the openings 86. This causes the nipples 26 to be clamped firmly between the two sets of recesses 82, 92. The recesses 82, 92 and the nipples 30 have interlocking portions that serve to prevent movement of the cylinders 12 relative to the mounting frame 72. The interlocking portions may be alternating peaks and valleys. The peaks in the recesses 82, 92 fit within valleys formed in the nipples 26. Ridges on the nipples 26 fit in the valleys in the recesses 82, 92. When the bolts 94 are tightened, the interlocking ridges and valleys prevent relative movement of the cylinders 12 and the frame member 74 in the direction of applied force.

When the nipples 26 are in the recesses 82, the keys 66 are in the recesses 80. Bolts 96 extend through openings 98 (FIG. 5) in the bases 64. The upper ends of the bolts 96 are threaded and they screw into the openings 84 which are internally threaded. When the bolts 96 are tightened, the end members 22 are secured to the frame member 76.

Figures 6, 11:
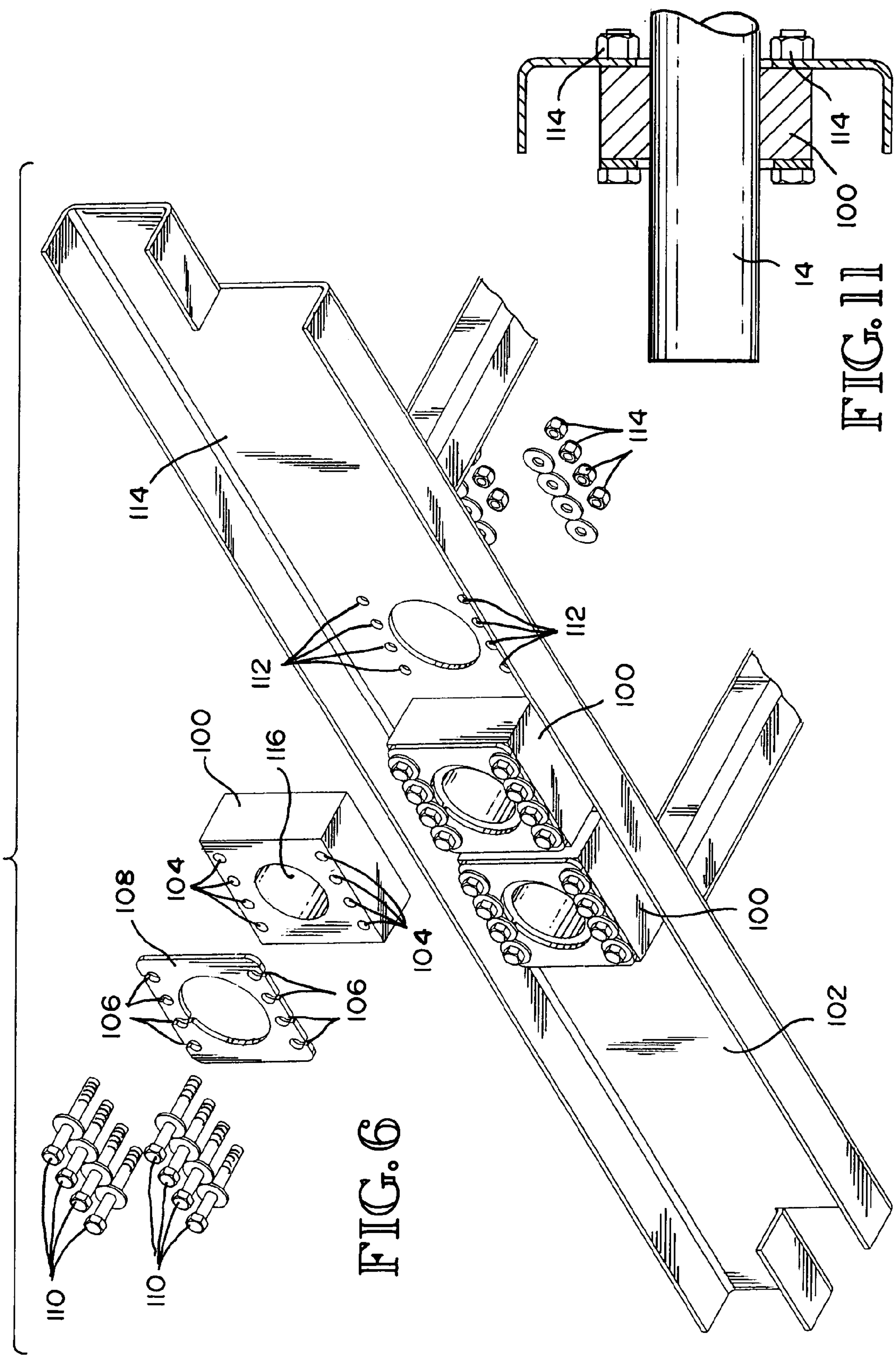
FIG. 6 is a fragmentary view of the left end portion of FIG. 2, with the bearing assembly for one of the push rods exploded apart and spaced from the transverse frame member at the end of the mounting frame.
FIG. 11 is an enlarged scale fragmentary view of the right end portion of FIG. 7, but facing in the opposite direction from FIG. 7, such view showing the outer end portion of the drive rod extending through a bearing that is connected to the transverse end member of the mounting frame at the drive rod end of the drive assembly.
Figure 7:
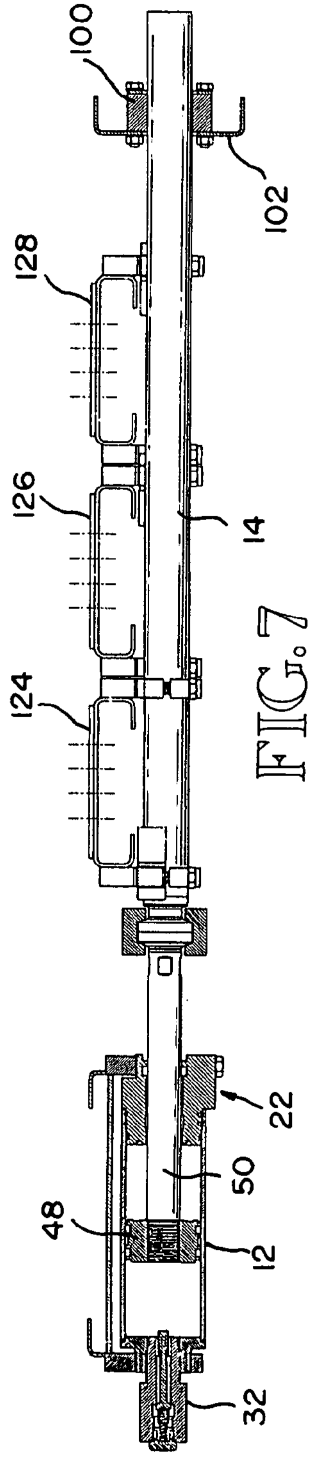
FIG. 7 is a longitudinal sectional view taken through the drive assembly, with some parts shown in side elevation.

The ends of the push rods 14 that are opposite the piston-rods 50 extend through bearing blocks 100 that are secured to transverse mounting frame 102. As best shown by FIGS. 6 and 11, the bearing blocks 100 are blocks of plastic, preferably, they are constructed from a high molecular weight resinous material referred to as umhw plastic. This material is readily available, is strong, is easily machined to the desired shape, and has exceptionally low surface friction. It is known to be an excellent bearing material. In the illustrated embodiment, eight openings 104 are formed in each block 100. The same number of openings 106 are formed in a metal cover plate 108. The openings 106 are aligned with the openings 104. A bolt 110 extends through a pair of aligned openings 104, 106 and further extends through another opening 112 formed in the web portion 114 of the frame member 102. The threaded ends of the bolts 110 pass through the openings 112 and each receives a nut 114, as shown by FIG. 11. Bearing blocks 100 are firmly connected to the frame member 102. The openings 116 and the bearing blocks 100 are sufficiently long to provide a substantial amount of support for the end portion of the push-rod 14.

Figure 1:
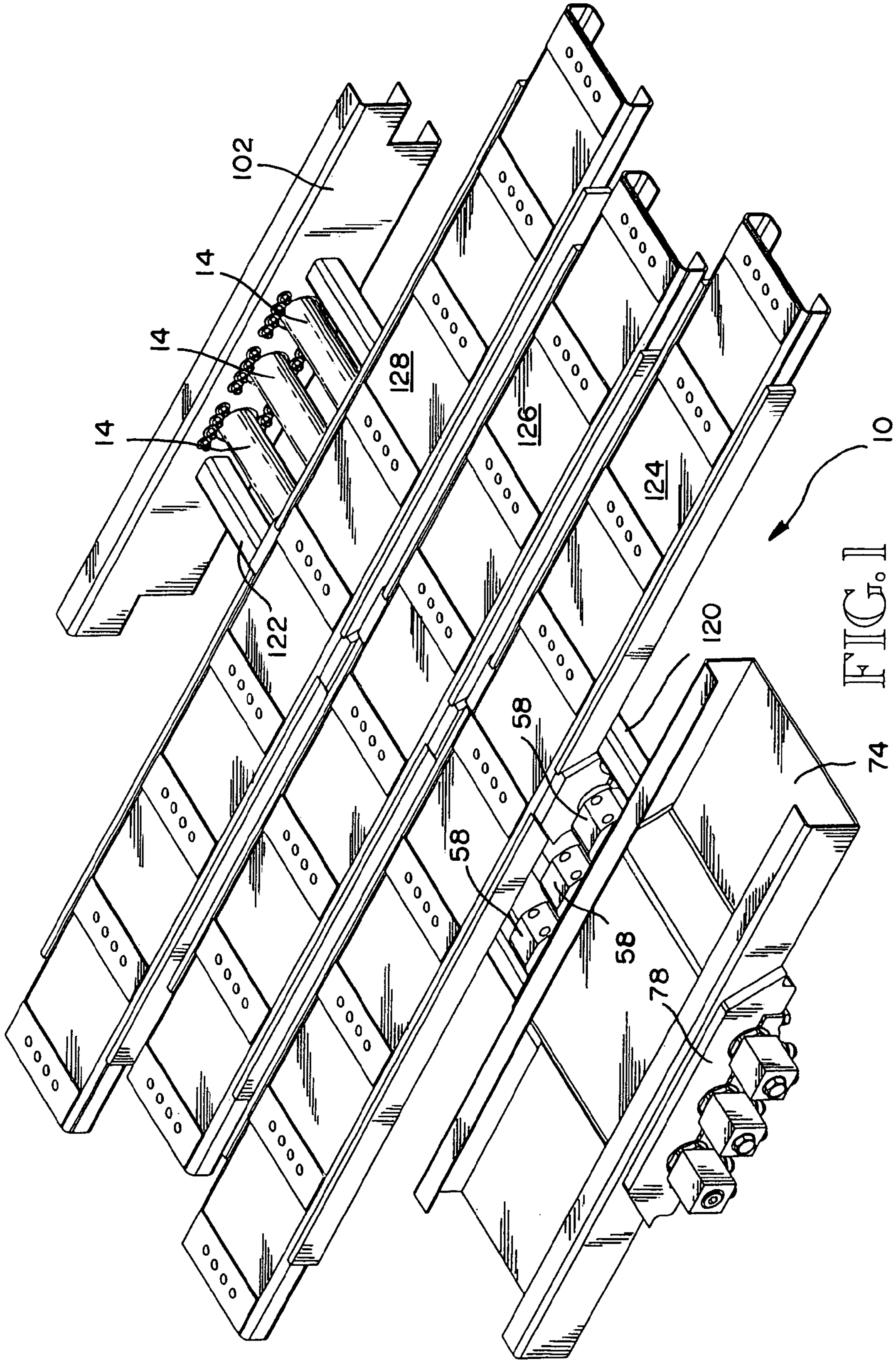
FIG. 1 is a pictorial view of a drive assembly for a reciprocating slat conveyor, taken from above and looking toward one end and one side of the assembly.
Figure 2:
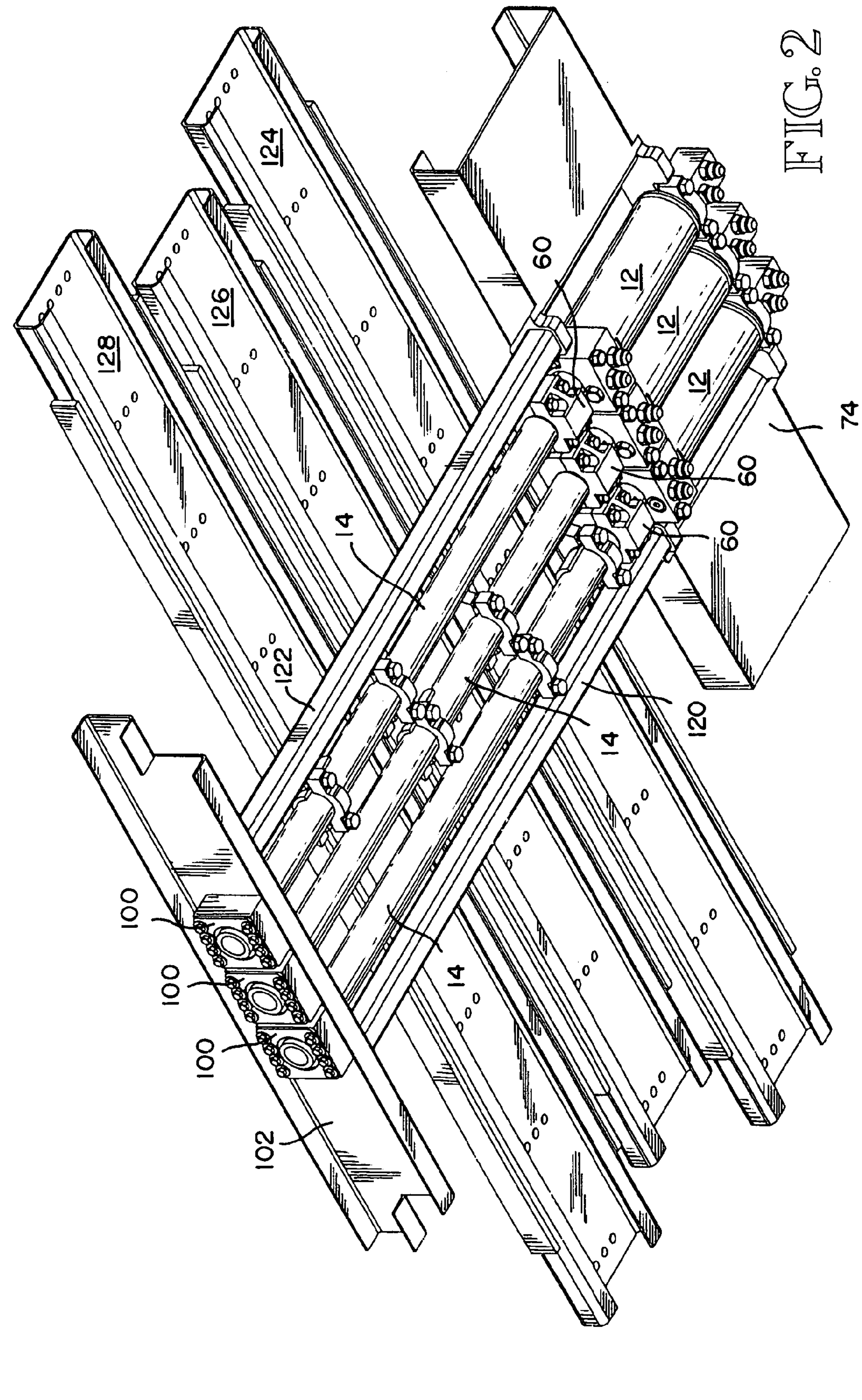
FIG. 2 is another pictorial view of the drive assembly shown by FIG. 1, such view being taken from below and looking towards the opposite end and the opposite side of the assembly from what is shown in FIG. 1.

As clearly shown by FIG. 2, longitudinal frame members 120, 122 extend between and interconnect the frame members 74, 102. The drive assembly 10 includes three transverse drive beams 124, 126, 128, one for each drive unit. The transverse drive beams 124, 126, 128 are connected to the push-rods 14, in a known manner. Upper clamp members are secured to the drive beams 124, 126, 128 above the push-rods 14. Removable clamps are provided the push-rods 14. Bolts are used to connect the lower clamp members to the upper clamp members. The members 16 on the push-rods 14 prevent unwanted axial movement of the beams 124, 126, 128 relative to the push-rods 14. The members 16 interlock with the upper clamp members on the beams 124, 126, 128 and prevent relative movement in the direction of applied force. This concept, including the construction of the members 16, is clearly disclosed in my U.S. Pat. No. Re. 35,022, granted Aug. 22, 1995, and entitled "Reduced Size Drive/Frame Assembly For A Reciprocating Floor Conveyor." See also the structure in my U.S. Pat. No. 5,996,774, granted Dec. 7, 1999 and entitled Drive Beam To Drive Unit Connections.

Figure 15:
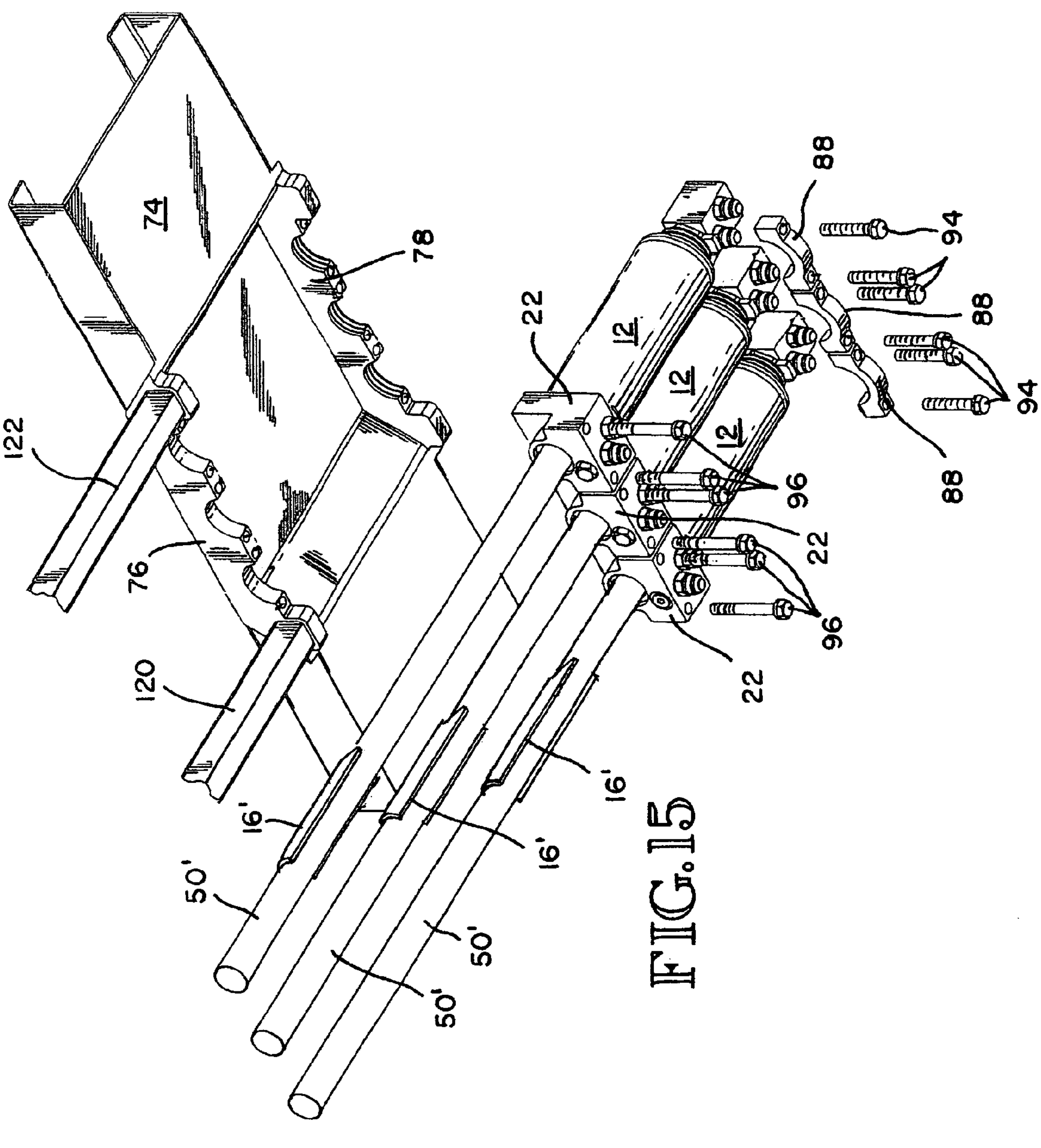
FIG. 15 is a view similar to FIG. 3, but showing drive units that have continuous piston rods.
Figure 16:
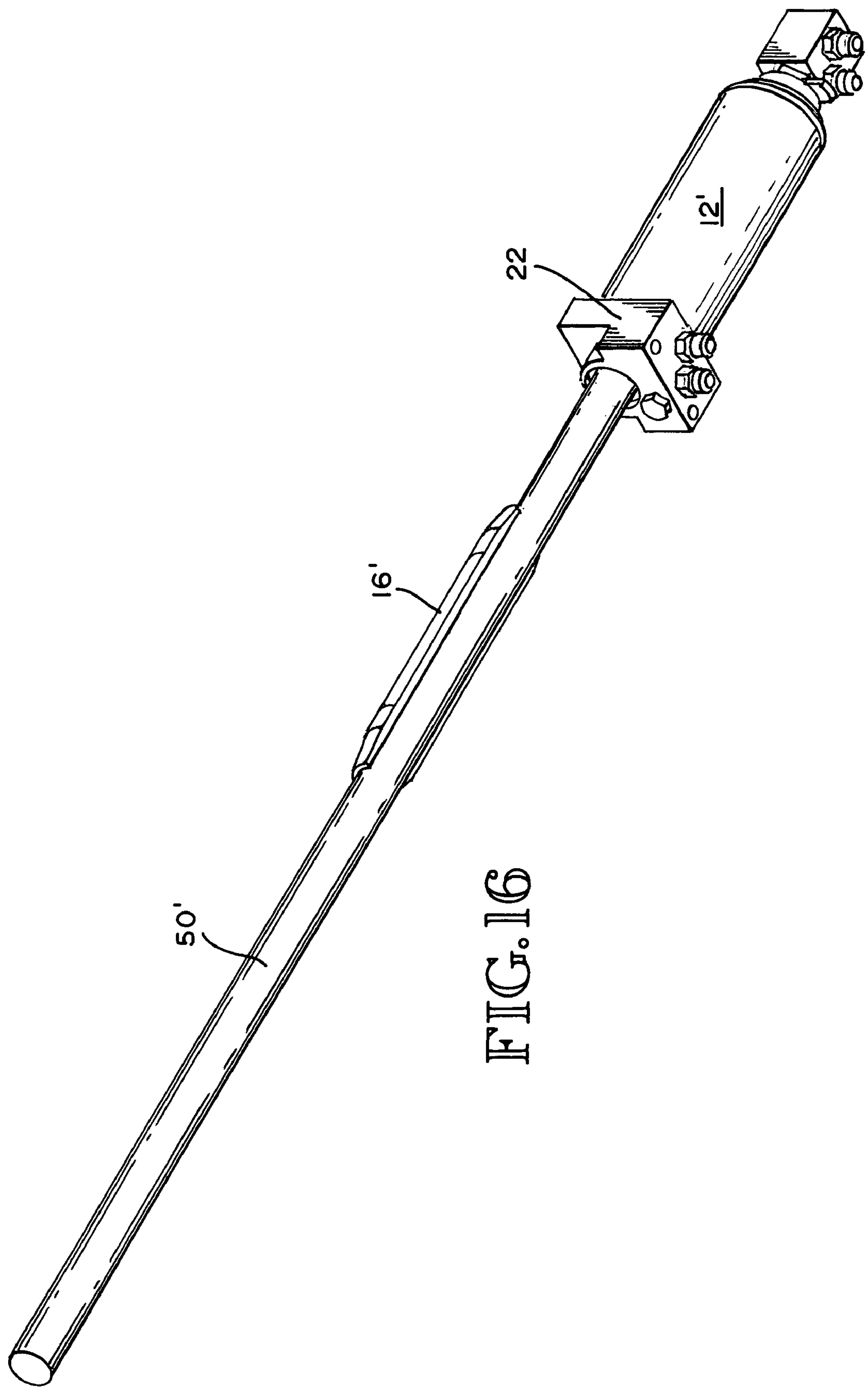
FIG. 16 is a view substantially like FIG. 4 but of the drive unit shown by FIG. 15.
Figure 17:
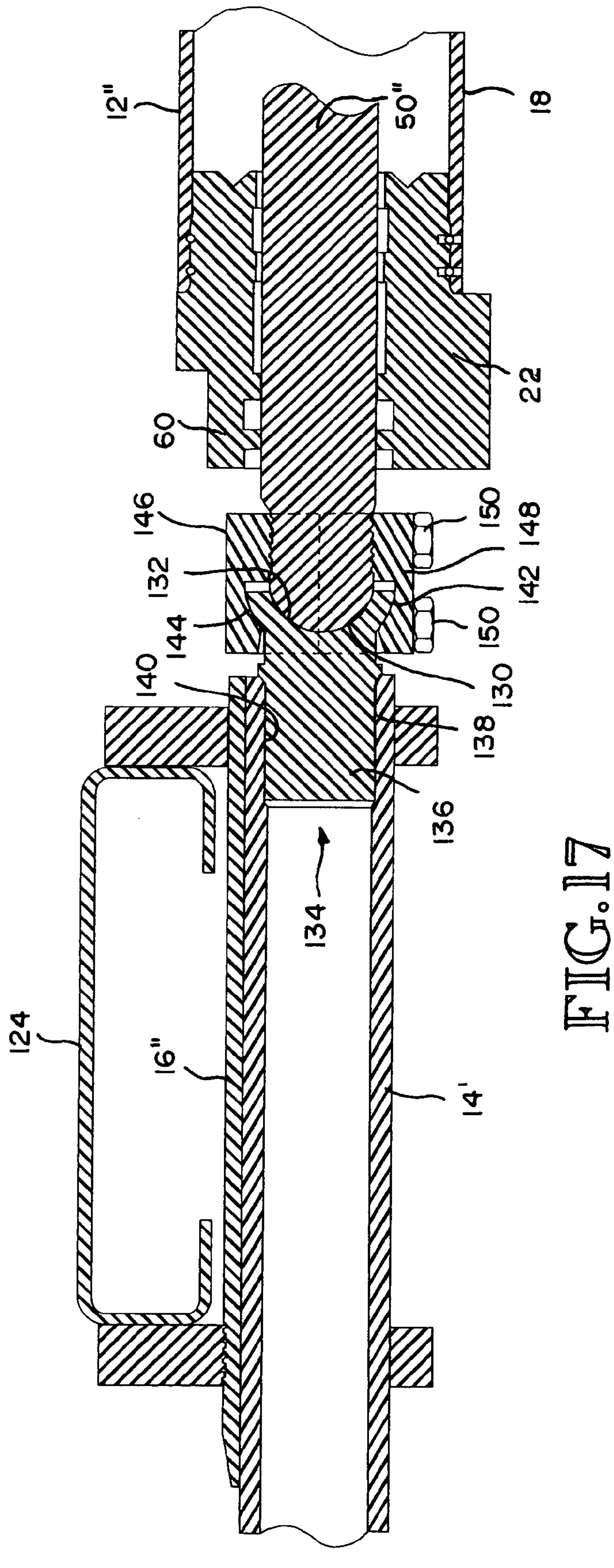
FIG. 17 is a view generally like FIG. 17 but showing a modified construction of the coupling between the piston rod and the drive rod.
Figure 18:
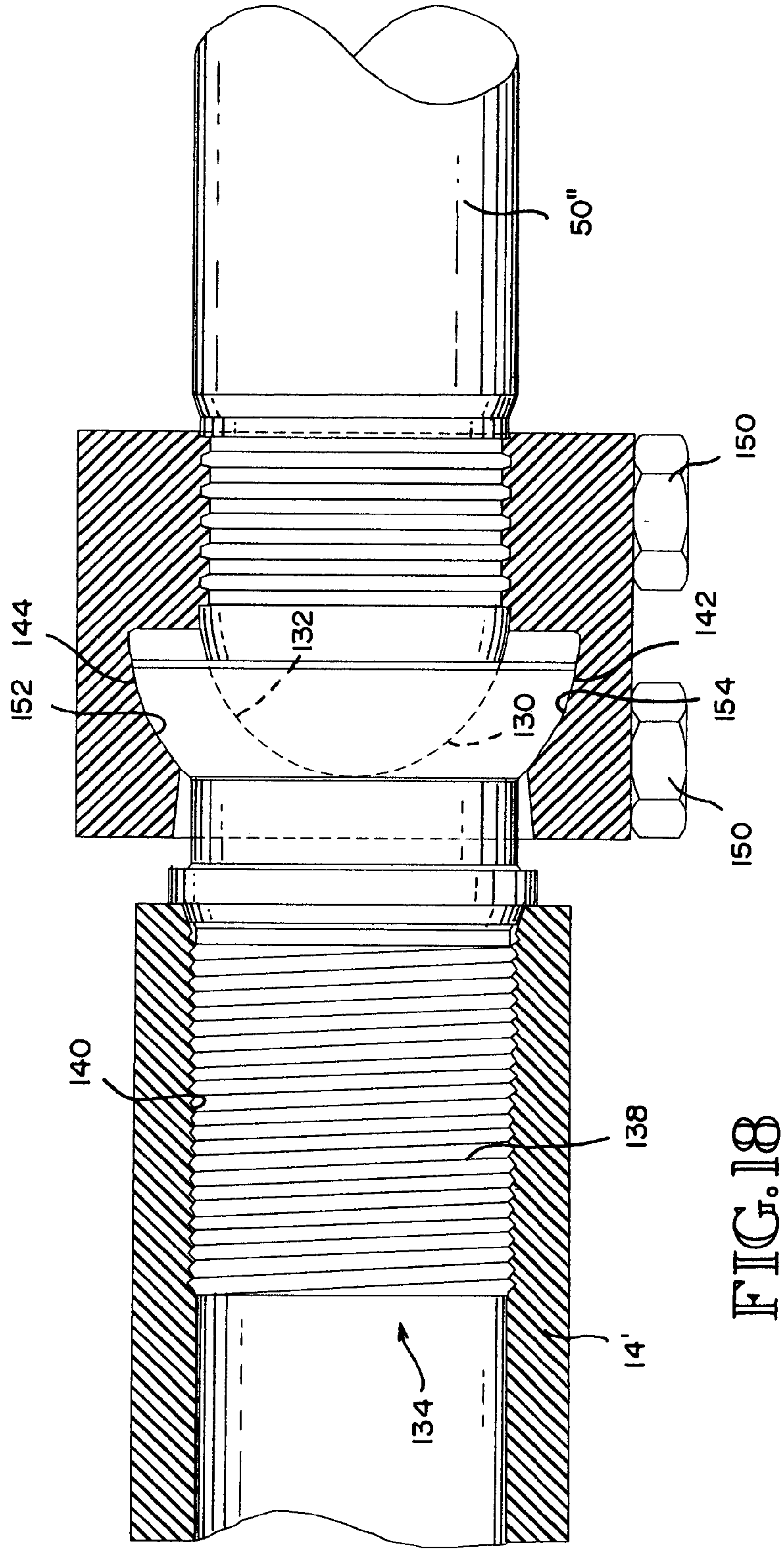
FIG. 18 is an enlarged scale view of the coupler assembly portion of FIG. 17, such view showing the fitting that is attached to the drive rod in side elevation and showing the drive rod and the member that is attached to the piston rod in longitudinal section.

FIGS. 15 and 16 show an embodiment in which the drive units have continuous piston-rods 50'. The ends of the rods 50' that are inside of the cylinders 12 are connected to piston-heads within the cylinder bodies, such as in the manner shown by FIG. 8. The difference is, instead of being connected to a push-rod, by some sort of joint structure, the piston-rod 50' extends outwardly from the piston-head 48 and itself serves as the push-rod. Each piston-rod 50' may be a single, continuous member. Or, it may be a continuous member made up of parts that are welded or otherwise connected together. Each piston-rod 50' is provided with a member 16' that interlocks with one of the upper clamp members that is attached to the related transverse beam 124, 126, 128. Ribs in valleys or some other suitable structure on the member 16' interlock with complementary ribs and valleys or other structure on the upper clamp parts.

FIGS. 17–20 relate to another embodiment in which each drive unit includes a push-rod 14' that is connected to a piston-rod 50". The outer end of the piston-rod 50' includes a convex end shape 130 that is of substantially spherical curvature. Shape 130 fits into a concave end cavity 132 of complementary curvature. That is, cavity 132 is concave and the curvature is a substantially spherical curvature. The cavity 132 is formed in the outer end of a member 134 that has an inner end portion 136 that is cylindrical and is externally threaded. The threads 138 mesh with complementary threads 140 that are formed in an end portion of the push-rod 14'. The concave surface 132 is a part of a cup-shaped member 142 that has a convex surface 144 on its outside. A coupler 146 is attached to the outer end of the piston-rod 50". Coupler 146 may be composed of two members, very similar to the members 58, 62 shown in FIG. 5. Piston-rod 50" includes circumferentially extending ribs and valleys on its outer end portion that is immediately inwardly of the convex surface 130. The members 146, 148 have semi-cylindrical portions with complementary ribs and valleys that engage the ribs and valleys on the piston-rod 50" when the coupler parts 146, 148 are connected together and secured to the piston-rod 50". Members 146, 148 are connected together by bolts 150. The coupler parts 146, 148 include an annular wall portion that surrounds the cup-shaped end portion on member 134. They have concaved surfaces 152, 154 (FIG. 18) that match the curvature of the surfaces 142, 144. In other words, surfaces 152, 154 have a substantially spherical curvature. The surfaces 130, 132, 142, 144, 152, 154 all share the same center of curvature. As a result, there can be universal pivotal movement of the push-rod 14' and the member 134 relative to the piston-rod 50" and the members 146, 148, such pivotal movement occurring about the shared center of curvature.

In the embodiment of FIGS. 17–20, the cylinder 12" may be fixed against movement relative to its mounting frame 74 and the outer end of the push-rod 14' may be held for a substantially straight line movement through the bearing blocks 100, while some limited pivotal movement is allowed by the connector between the two rods. The end member 22 provides a long bearing support of the piston-rod 50". As a result, the cylinder 12" can withstand substantial side loading imposed by weight on the floor acting on the transverse beam 124 and the push-rod 14'.

Figure 19:
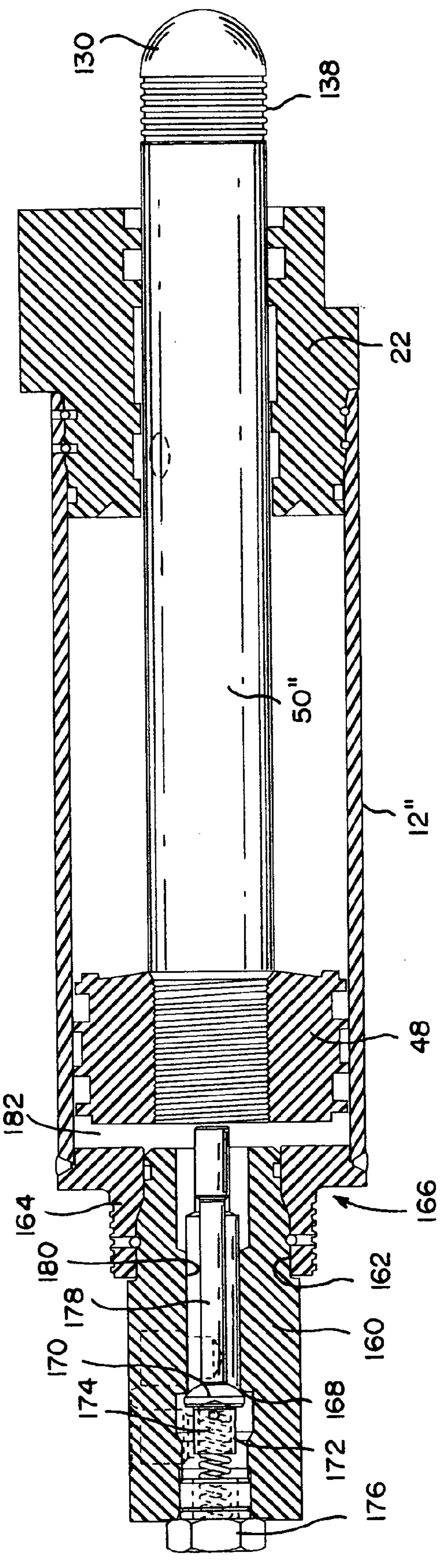
FIG. 19 is a view similar to the drive unit portion of FIG. 8.
Figure 20:
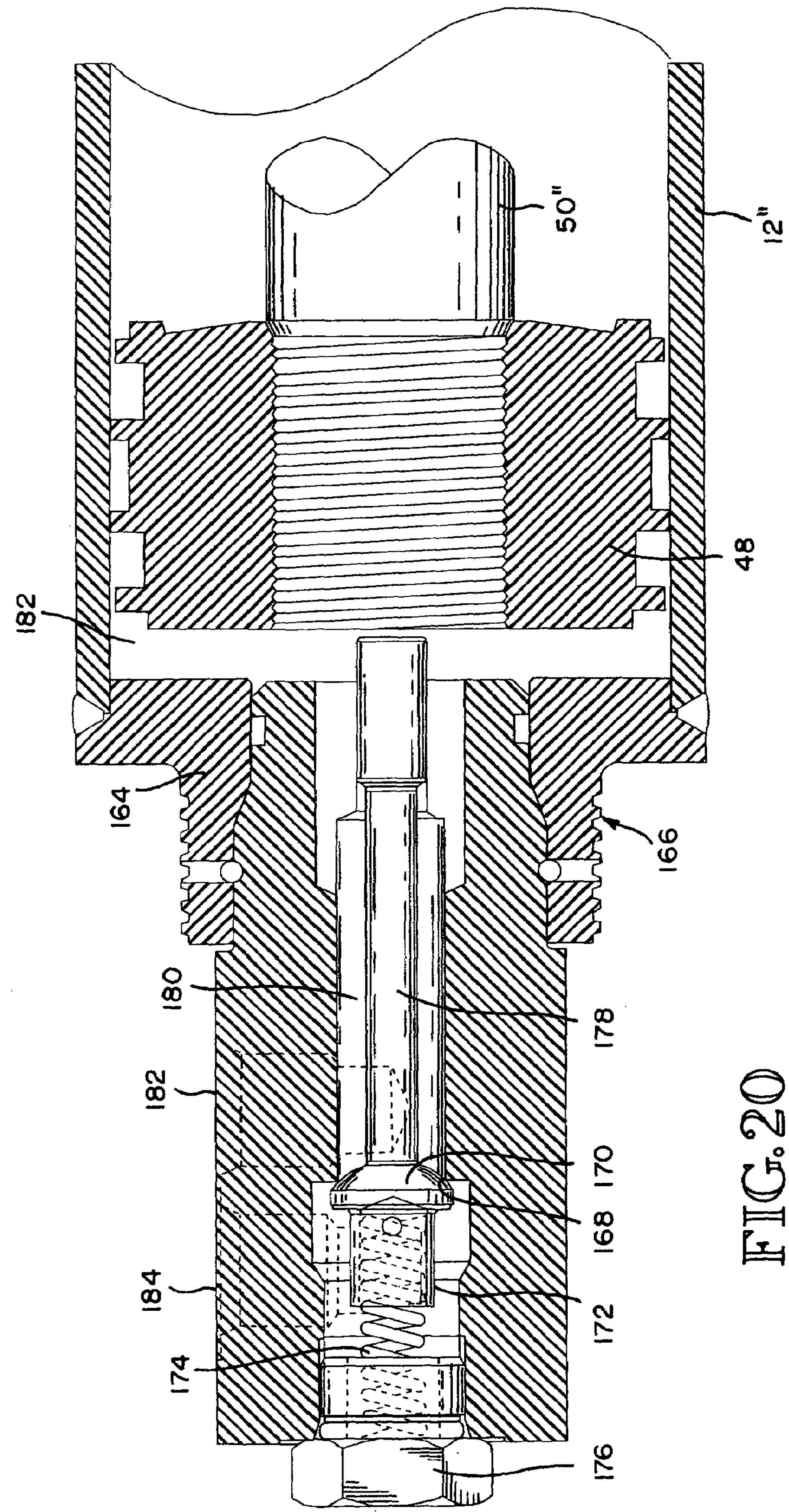
FIG. 20 is an enlarged scale view of the left end portion of FIG. 19.

Referring to FIGS. 19 and 20, in this embodiment, a fitting 160 fits within an axial socket 162 formed in the nipple 164 that is a part of the end member 166 at the closed end of the cylinder 12". In this embodiment, either a lockwire connection or a threaded connection is used for securing the member 160 to the member 164. Member or fitting 160 includes a valve seat 168 and a valve plug 170 that moves towards and away from the valve seat 168. A cup 172 may be provided outwardly of the valve plug 170. A compression spring 174 may extend into this cup 172. The opposite end of the spring 174 may make engaging contact with a removable plug 176. When the parts are in the position shown by FIG. 19, the spring 174 functions to urge the valve plug 170 against the valve seat 168. A valve operator 178 is connected to the valve plug 170 on the side thereof opposite the cup 172. Operator 178 extends from the valve plug 170, axially through passageway 180 and the member 160 and at its inner end protrudes into the working chamber 182. When the piston-head 48 and piston-rod 50" are retracted, the side of the piston-head opposite the rod 50" will contact the end of the operator 170. As piston-head 48 moves closer towards the end of the working chamber 182, it moves the operator 178 with it. Operator 178 in turn moves valve plug 170 away from the valve seat 168, opening a fluid passageway between a side port and member 160 and the center passageway 180. When the valve plug 170 is against the valve seat 168, there is communication between side port 182 and passageway 180. The valve plug 160 blocks communication between side port 184 and passageway 180. However, when the operator 178 is depressed, and valve plug 170 is unseated from the seat 168, there will be communication between side port 184 and passageway 180.

Figure 21:
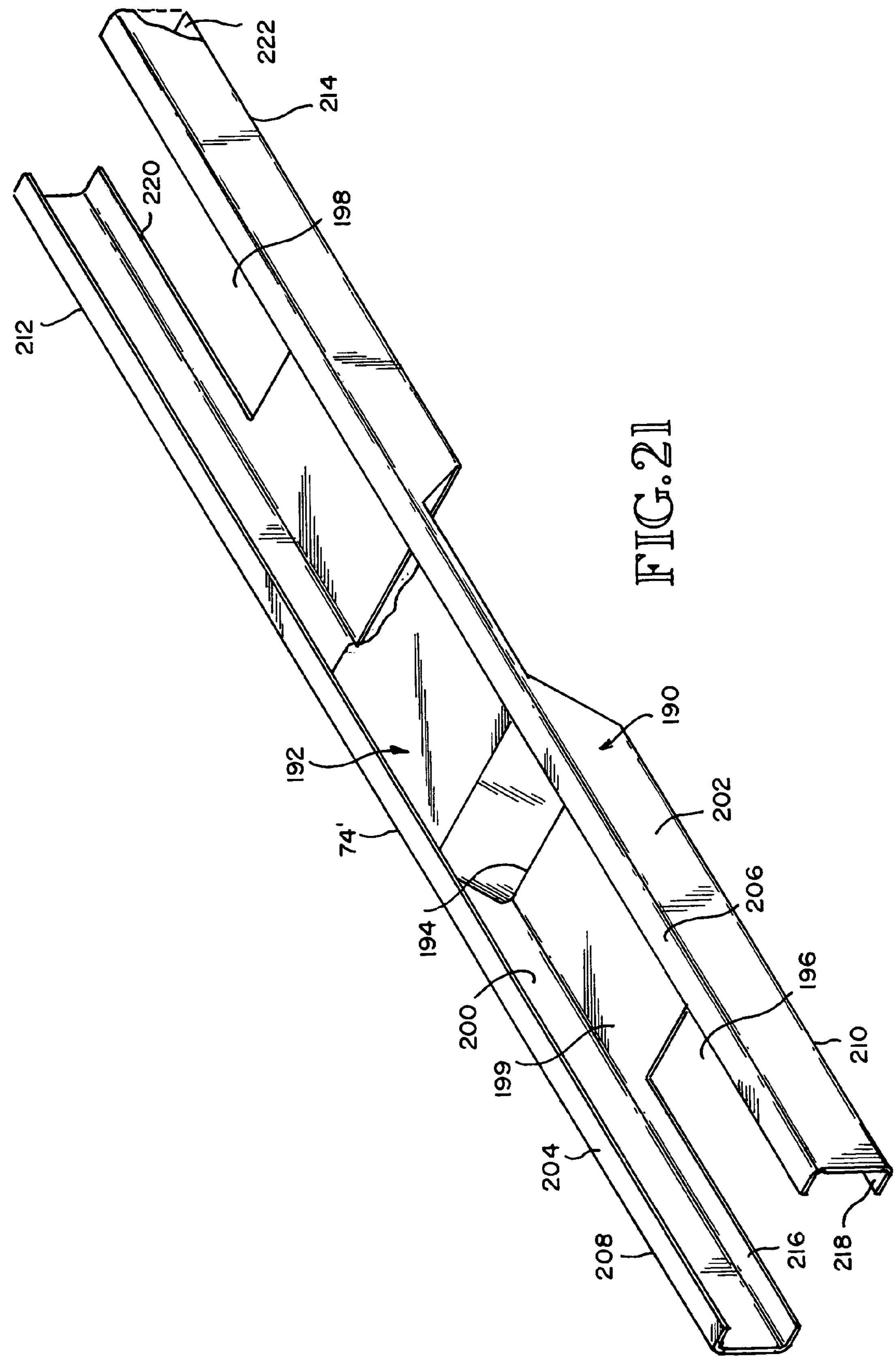
FIG. 21 is a pictorial view of a modified construction of the transverse frame member at the cylinder end of the drive assembly, such view being taken from above and looking towards one end, the outer side and the top of the frame member.
Figure 23:
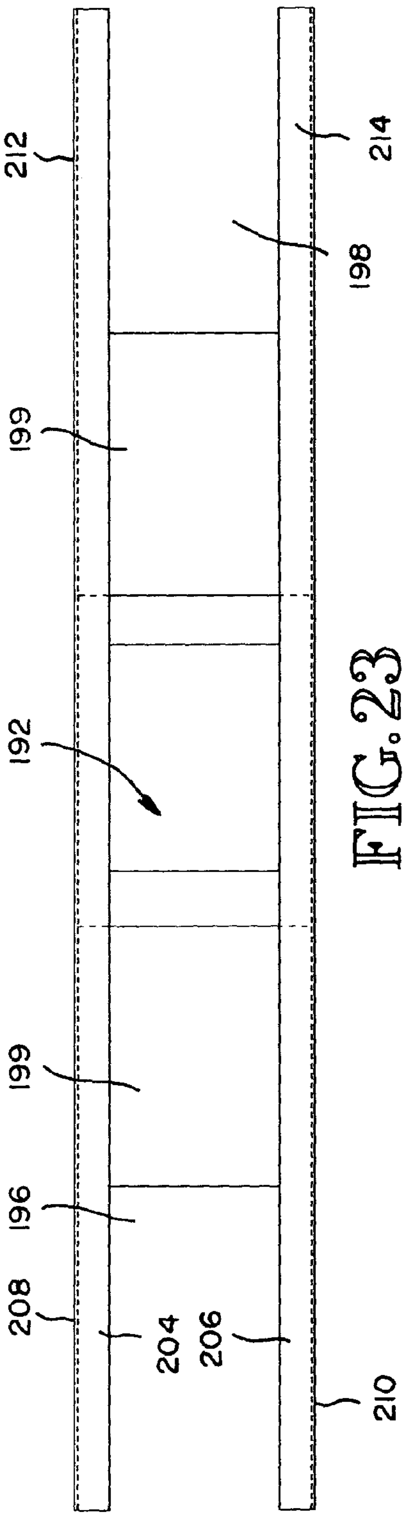
FIG. 23 is a top plan view of the frame member shown by FIGS. 21, 22 and 24.
Figure 22:
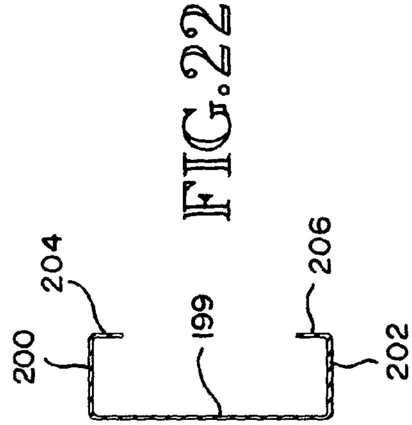
FIG. 22 is an end view of the frame member shown by FIGS. 21–24.
Figure 24:
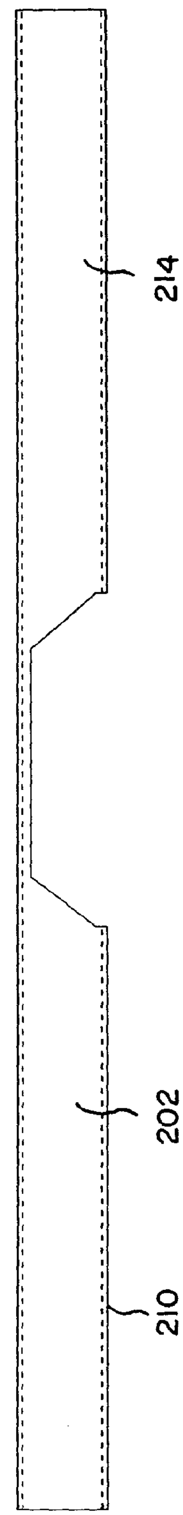
FIG. 24 is a side elevational view of the frame member shown by FIGS. 21–23.

FIGS. 21–25 show a modified frame structure that can be used by any of the above described embodiments. As previously described, the frame structure comprises two transverse mounting frame members 74', 102'. In the earlier embodiments, the frame members 74, 102 are of a length to be used with a center frame trailer. The ends of the frame members 74, 102 are connected to the two longitudinally extending mainframe beams. Then, cross-frame members are connected to the ends of the frame members 74, 102. These cross-frame members extend outwardly from the ends of the frame members 74, 102 to the sidewall region of the trailer or other installation in which the drive assembly is mounted. In the embodiment of FIGS. 21–25, the two frame members 74', 102' are constructed to include the cells. Referring to FIG. 21, frame member 74' of two-piece construction. The pieces or members are designated 190, 192. By way of typical and therefore non-limitive example, member 190 may be constructed from Swedish steel measuring 3⁄16 inch thick. Member 192 may be constructed from Swedish steel measuring ¼ inch thick. Member 190 is made in the following manner. A flat sheet of material is provided and an opening is cut in it where member 192 is to be added. Also, the openings 196, 198 are made. These openings may be made by cutting the flat sheet of steel by use of a plasma cutting machine. After the flat sheet is cut, it is bent into the shape shown in the drawings. It is bent to assume the shape of a flanged channel except for the places 194, 196, 198 where the cutouts have been made. In the central part of the frame member 74', outwardly on each side of the central cutout 194, the member 74' includes a web 198, a pair of flanges 200, 202 and a pair of lips 204, 206. Flanges 200, 202 extend substantially perpendicular to web 198 and lips 204, 206. Lips 204, 206 are in coplanar parallelism. Lips 204, 206 are perpendicular to flanges 200, 202 and are parallel to web 198. In the opposite end region which include the cutouts 196, 198, in the web 199, channel beams 208, 210, 212, 214 are formed. In the sections of the member 74', the flanges 200, 202 become webs and the lips 204, 206 become flanges. Also, the remaining side portions 216, 218, 220, 222 of the web 198 become lower flanges for the beam sections 208, 210, 212, 214. Member 192 is cut and then formed into the shape indicated. It is then set into the center cutout 194 and is welded to the inner edges of the web 199 and to the members 204, 206 and the members 200, 202. The member 192 forms a downwardly opening compartment in which the central portions of the cylinders are received. The frame members 76, 78 are welded to the sides 74' at the location shown in FIG. 3, for example.

Figure 25:
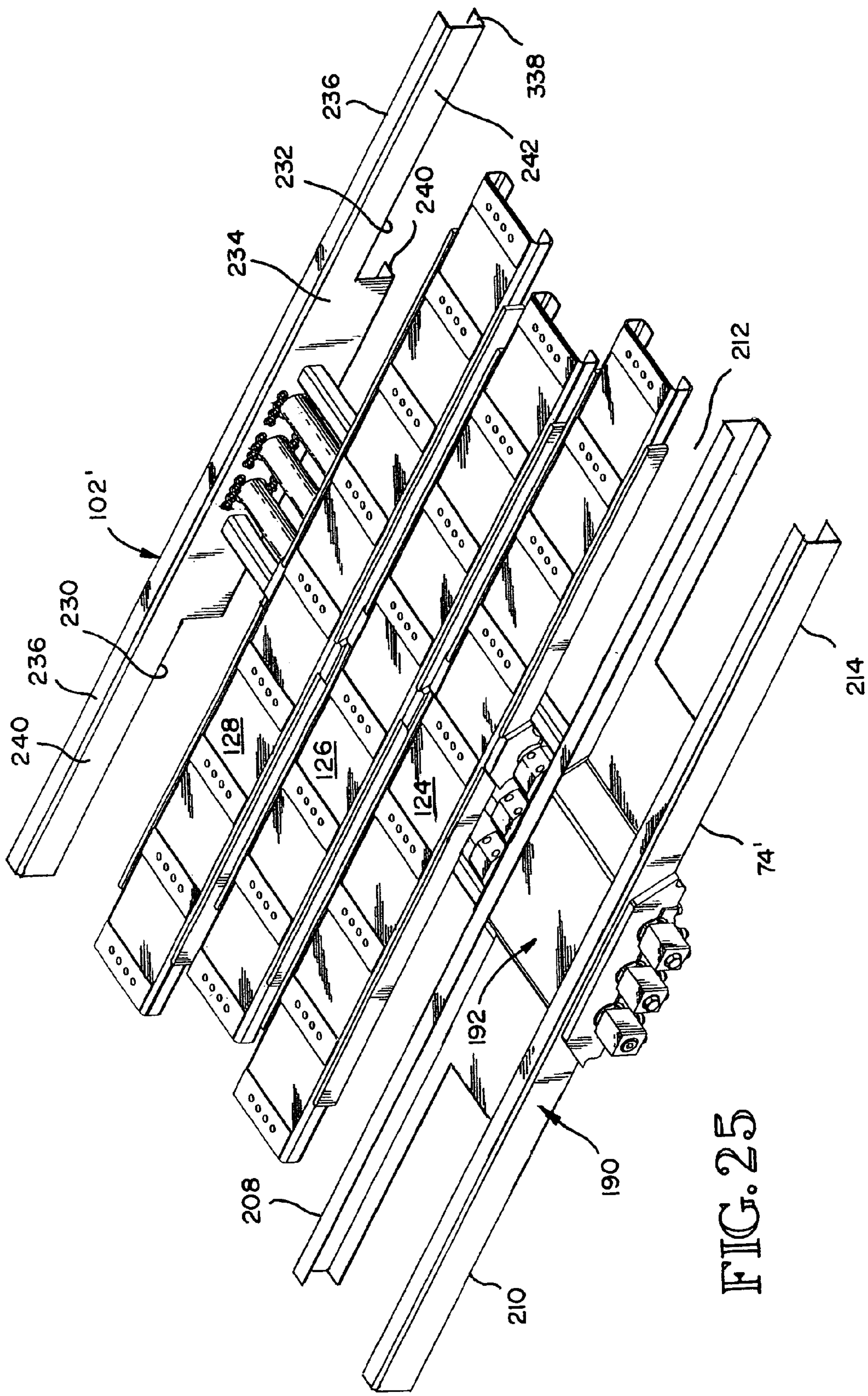
FIG. 25 is a pictorial view of the drive assembly shown by FIG. 1, with the modified construction of the transverse frame members.

Referring to FIG. 25, the transverse mounting frame member 102' is also formed from a flat sheet of steel. For example, it may be formed from a sheet of Swedish steel that is about 3⁄8 inch thick. Regions 230, 232 are cut from the sheet and then the sheet is bent to form web 234 and flanges 236, 238, 240. Thus, the central portion of frame 102 has a channel shape with a deep web. The end portions each have a channel shape with a shallower web. The lower central portion may extend downwardly between two mainframe beams. The end channel 240, 242 first extend outwardly over the tops of the mainframe beams and then continue on to the side of the trailer or other installation in which the drive assembly is mounted.

The illustrated embodiments are examples of the present invention and, therefore, are non-limitive. It is to be understood that changes in the particular structure, materials and features of the invention may be made without departing from the spirit and scope of the invention. Therefore, it is my intention that my patent rights not be limited by the particular embodiments that are illustrated and described herein, but rather invention is to be determined by the following claims, interpreted according to accepted doctrines of patent claim interpretation, including the use of the doctrine of equivalents.

What is claimed is:

1. A liner hydraulic drive unit, comprising:

a transverse frame member having a downwardly directed recess;

a hydraulic cylinder having a sidewall forming a piston chamber, a closed end, a rod end, a piston head within the piston chamber, a piston rod connected to the piston head and extending axially of the hydraulic cylinder out through the rod end of the hydraulic cylinder, and an end member at the closed end of the hydraulic cylinder having a radial wall portion and a tubular nipple portion extending axially outwardly from the radial wall portion, said radial wall portion including an outer surface extending radially outwardly from the nipple;

a removable clamp member connectable to the frame member, said clamp member including a recess for receiving a portion of said tubular nipple;

said tubular nipple being received in the recess in the frame member with the radial outer surface of the radial wall portion of the end member being contiguous a surface of the frame member bordering the recess in the frame member;

said recess in said removable clamp member receiving a portion of said tubular nipple that is not within the recess in the frame member;

said clamp member having a radial side surface that is contiguous the outer surface of the radial wall portion of said end member; and bolts removably connecting the clamp member to the frame member, with the tubular nipple portion of the end member being received in and clamped by and between the recess in the frame member and the recess in the clamp member.

2. The linear hydraulic drive unit of claim 1, wherein the tubular nipple includes a center opening and a tubular fitting is received within said center opening, said tubular fitting provided a passageway for hydraulic fluid entering into and leaving from the piston chamber at the closed end of the hydraulic cylinder.

3. The linear hydraulic drive unit of claim 2, wherein the fitting includes a valve and a valve operator that extends axially into the piston chamber and includes an inner end portion that is adapted to be contacted by the piston head, wherein when the piston head is retracted in the piston chamber, it contacts the inner end of the valve operator and moves the valve operator outwardly and in response to such movement the valve operator opens the valve, said valve being normally closed when the piston head is not depressing the valve operator.

4. The linear hydraulic drive unit of claim 3, wherein the valve includes a valve seat and a valve plug outwardly of the valve seat that is connected to the outer end of the valve operator, and the valve also includes a compression spring operating to normally seat the valve plug against the valve seat.

5. The linear hydraulic drive unit of claim 1, wherein an outer surface of the tubular nipple, the recess in said transverse frame member and the recess in the removable clamp member having complementary interlocking surfaces which function to prevent axial movement of the hydraulic cylinder relative to the transverse frame member and the removable clamp member.

6. A linear hydraulic drive unit, comprising: a transverse frame member having a downwardly directed recess; a hydraulic cylinder including a closed end and a rod end, a rod-end member having a base, a radial end wall extending upwardly from a portion of said base, and a key above another portion of said base, said key extending axially from the radial end wall;

said rod-end member including a piston rod opening extending through the key and through a portion of the base; said rod-end member further including a nook above the base and the key, said nook being bounded on one side by the radial end wall;

said base having a pair of shoulders, one on each side of the key, and a pair of bolt receiving openings extending through the base and the shoulders;

said frame member having a key receiving recess adapted to snugly receive the key, and having a side surface that is contiguous the radial end wall of the rod end member when the key is within the key recess;

said frame member having a pair of shoulders, one on each side of the key recess;

said frame member shoulders confronting the shoulders on the rod-end member when the key is within the key recess and the side surface is contiguous the radial end wall of the rod-end member;

said frame member shoulders having bolt receiving openings therein that are alignable with the bolt receiving openings in the rod-end member when the key is within the key recess and the side surface of the frame member is contiguous the radial end wall; and bolts extendable through the bolt receiving openings in said rod-end member and the bolt receiving openings in said frame member shoulders; and said bolts connect the rod-end member of the of the hydraulic cylinder to the transverse frame member.

7. The linear hydraulic drive unit of claim 6, comprising a second transverse frame member having a downwardly directed recess adjacent the closed end of the hydraulic cylinder;

said hydraulic cylinder having an end member at its closed end, said end member having a radial wall portion and a tubular nipple portion extending axially outwardly from the radial wall portion, said radial wall portion including an outer surface extending radially outwardly from the nipple;

a removable clamp member connectable to the second frame member, said clamp member including a recess for receiving a portion of tubular nipple; said tubular nipple being received in the recess in the second frame member with the radial outer surface of the radial wall portion of the end member being contiguous a surface of the second frame member bordering the recess in the second frame member;

said recess in said removable clamp member receiving a portion of said tubular nipple that is not within the recess in the second frame member;

said clamp member having a radial side surface that is contiguous the outer surface of the radial wall portion of said end member; and bolts removably connecting the clamp member to the frame member, with the tubular nipple portion of the end member being received in and clamped by and between the recess in the second frame member and the recess in the clamp member.

8. The linear hydraulic drive unit of claim 7, wherein the tubular nipple includes a center opening and a tubular fitting is received within said center opening, said tubular fitting provided a passageway for hydraulic fluid entering into and leaving from the piston chamber at the closed end of the hydraulic cylinder.

9. The linear hydraulic drive unit of claim 8, wherein the fitting includes a valve and a valve operator that extends axially into the piston chamber and includes an inner end portion that is adapted to be contacted by the piston head, wherein when the piston head is retracted in the piston chamber, it contacts the inner end of the valve operator and moves the valve operator outwardly and in response to such movement the valve operator opens the valve, said valve being normally closed when the piston head is not depressing the valve operator.

10. The linear hydraulic drive unit of claim 9, wherein the valve includes a valve seat and a valve plug outwardly of the valve seat that is connected to the outer end of the valve operator, and the valve also includes a compression spring operating to normally seat the valve plug against the valve seat.

11. The linear hydraulic drive unit of claim 7, wherein an outer surface of the tubular nipple, the recess in said transverse frame member and the recess in the removable clamp member having complementary interlocking surfaces which function to prevent axial movement of the hydraulic cylinder relative to the transverse frame member and the removable clamp member.

* * * * *